April 13, 1926. 1,580,473
J. B. DYER
METHOD AND MEANS FOR SEPARATING DUST FROM AIR
Filed Nov. 25, 1922
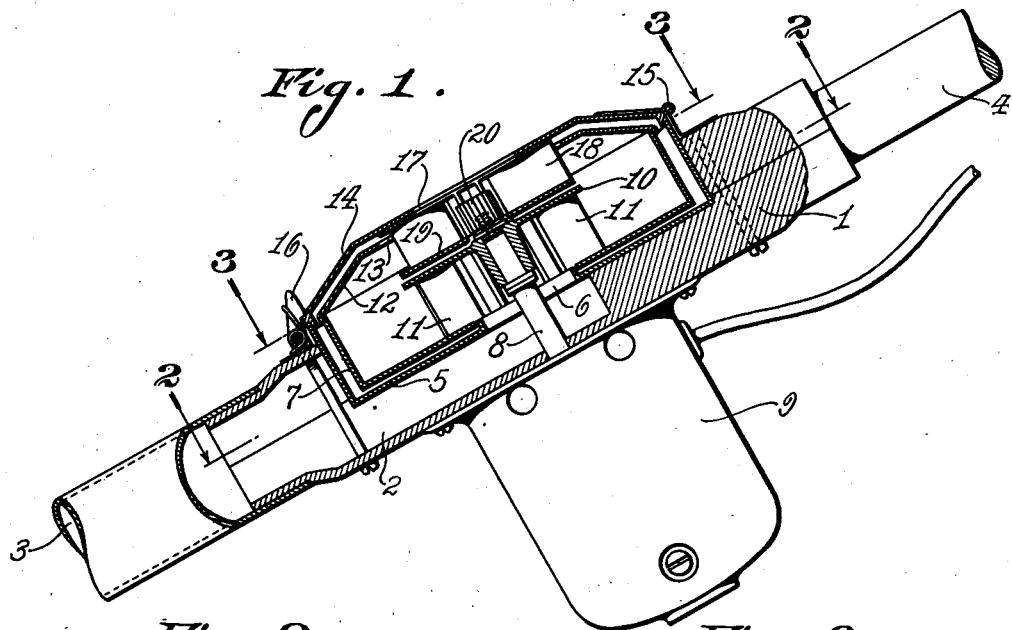
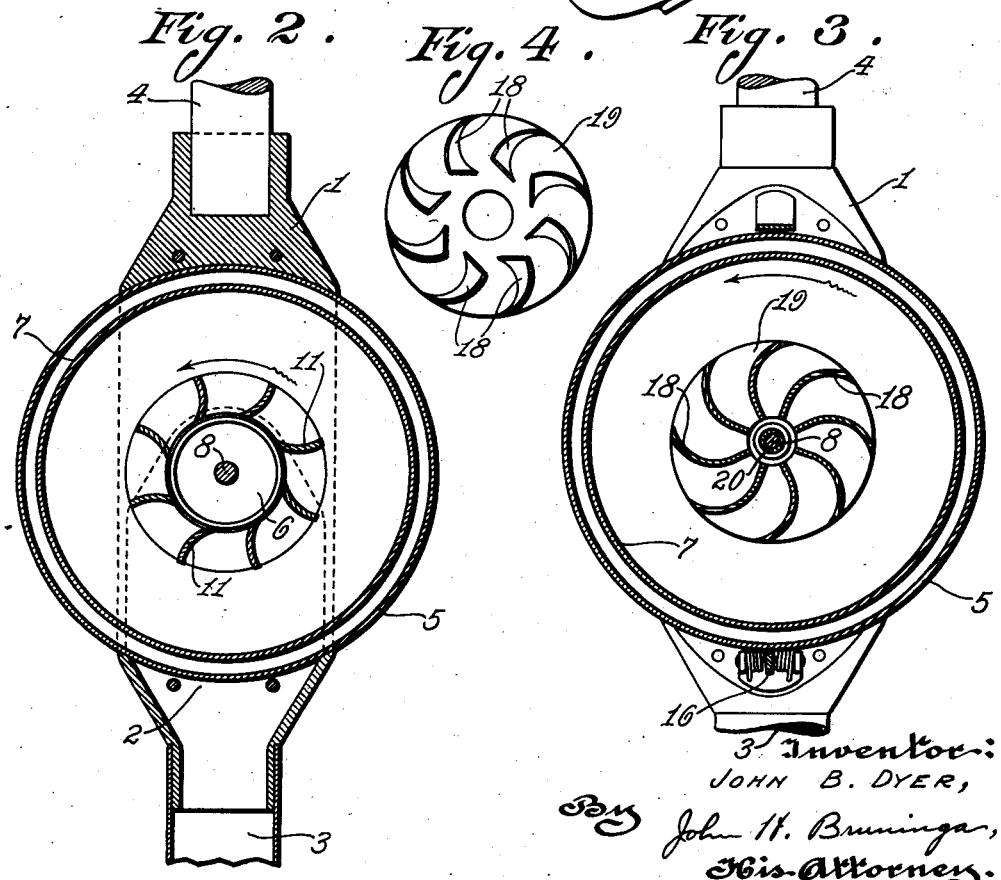
Inventor:
JOHN B. DYER,
By John W. Bruninga,
His Attorney.

Patented Apr. 13, 1926.

1,580,473

UNITED STATES PATENT OFFICE.

JOHN B. DYER, OF FERGUSON, MISSOURI.

METHOD AND MEANS FOR SEPARATING DUST FROM AIR.

Application filed November 25, 1922. Serial No. 603,166.

*To all whom it may concern:*

Be it known that I, JOHN B. DYER, a citizen of the United States, and residing at Ferguson, St. Louis County, Missouri, have invented the new and useful Improvement in Methods and Means for Separating Dust from Air, of which the following is a specification.

This invention relates to a method and apparatus for separating dust from air. While in the following, the description is confined to purifying air, this method and apparatus can, of course, be used for separating dust and suspended particles from any other gas as well. In the most general application of apparatus for separating dust from air, namely the well known vacuum sweeper, the dust laden air is sucked up by a fan of some sort. The suction of the fan in most cases is also effective in stirring up the dust which is to be carried off so as to mix the same with the inrushing air. The dust laden air is then passed through a separating chamber formed by a porous bag or similar device which will allow the air to pass through but will retain most of the dust. With this method, the fan which moves the air must not only supply a strong suction so as to provide a sufficient volume of moving air to gather up the dust to be removed, but it must also supply sufficient pressure to force the air through the pores of the bag. In order to be effective, such a bag must have comparatively small pores so that it will catch the finest dust particles. Consequently the pressure required to force the air through the small openings is considerable. After using such a bag for an extended period, the pores become clogged up with dust so that the resistance to the passage of air through the pores is greatly increased and the effectiveness of the device accordingly diminished.

One of the objects of this invention, therefore, is to provide a method and means for separating the dust from the air which will render unnecessary the use of porous bags and similar devices.

Another object of this invention is to provide a method and apparatus, whereby the dust may be separated from the air by mechanical action, and whereby the dust will be retained within the apparatus while the air may pass freely therethrough.

Further objects will appear from the detail description taken in connection with the accompanying drawing, in which:

Figure 1 is a longitudinal sectional view of a vacuum sweeper embodying this invention;

Figure 2 is a section on line 2—2, Figure 1;

Figure 3 is a section on line 3—3, Figure 1; and

Figure 4 is a detail showing another construction for the stationary vanes.

While in the following the description of the method and apparatus is given as applying to a vacuum sweeper, the invention may also be applied to other devices for separating dust from gases, such as in the case of separating out the dust collected from sanding and finishing machines in shoe factories and similar apparatus in chemical dust separating processes which are at present carried on in bag-houses, and to other like processes.

In accordance with this invention, the body of air to be purified is set in rotation at a high speed. As the air assumes the form of a rapidly whirling annulus, the dust particles contained therein will, by centrifugal action, be thrown outwardly to the outer region of the rotating annulus. On account of this action, the air in the interior or central portion of the rotating annulus will become free from dust particles and purified. In accordance with this invention the air at the interior portion of the rotating annulus is then directed inwardly and to the outlet of the apparatus. Thus the purified air is removed from the whirling body so as to allow a free supply of dust laden air to be introduced thereinto. In this method, therefore the dust laden air is set into rotation and delivered to the whirling annulus or rotating body of air, wherein the dust particles are thrown to the outer part of the annulus. The purified air is then extracted from the interior portion of the annulus and by reducing its rotation directed inwardly or centripetally therefrom and discharged.

Referring to the accompanying drawing, 1 designates a body or base upon which the apparatus is carried. This base has hollowed out therein a chamber 2 communicating with a suction head or sweeper of any suitable design, not shown. A handle 4 may be attached to the body 1 for manipulating the sweeper.

Mounted on the base 1 is an outer casing or container 5 provided with a central opening 6 communicating with the chamber 2 in the base 1. Within the container 5 is an inner casing 7 which is mounted for rotation on the shaft 8 of a motor 9 mounted on the base 1. The shaft 8 extends through the base 1 and through the opening 6 of the container 5 and carries a spider 10 upon which the inner casing 7 is mounted for rotation on the shaft 8. The arms of the spider may be formed to provide vanes 11 arranged in the form of a fan and at the same time, carrying the casing 7. It will be evident, therefore, that upon starting the motor, the vanes 11 and the casing 7 will be driven at a high rotative speed. The casing 7 may also be provided with a removable cover 12 having an outlet opening 13.

The outer container 5 may be provided with a cover 14 hinged at 15 to the container and provided with a latch 16 to keep it closed. The cover 14 is provided with an outlet opening 17 opposite the opening 13 in the cover 12. Mounted on the cover 14 and extending into the opening 13 is a series of vanes 18. These vanes may be supported by a plate 19 at their inner extremities so as to make them rigid. The series of vanes 18 has an outside diameter approximately the same as the series of vanes 11 and the vanes 18 extend inwardly to or beyond the rim of the opening 17 in the cover 14. The vanes 18 may be curved as illustrated in Figures 3 and 4 having their outer edges directed against the movement of the rotating annulus of air contained in the casing 7. The direction of rotation of this air is indicated by the arrow, in Figure 3. The blades 18 may also be twisted so as to deflect the air outwardly at the opening 17 as indicated in Figure 4.

In the operation of this device, the rotation of the vanes 11 with the casing 7 by the motor 9 sets into rotation the air confined between the blades 11. Such rotation produces centrifugal action which throws the air outwardly into the casing 7. The movement of air outwardly from the vanes 11 creates a suction at the opening 6 so as to draw air from the chamber 2 and the inlet 3. The vanes 11 thus set the air into rotation and deliver the same to the casing 7 so as to form therein a rapidly rotating annulus of dust laden air. The dust contained in this annulus is then thrown outwardly by a centrifugal force and lodges against the outer wall of the casing 7. Since the air composing this annulus and the casing 7 are rotating together, there will be no movement of the air relative to the dust lodged against this outer wall, so that the dust will not be blown away. As the dust particles move outwardly, the air along the inner portion of the annulus becomes purified. The vanes 18 being directed against the movement of the air in the casing 7 will scoop the cleansed air from the inner portion of the annulus and convey it inwardly or centripetally along the blades 18 to the opening 17 where the purified air will be discharged. The vanes 18 also assist the action of the vanes 11 by reducing the rotation of the air at the outlet of the casing 7 and, therefore, reducing the back pressure which would be present if this body of air were in rotation.

It will thus be seen the the invention accomplishes its objects. The vanes 11 operate to set the air into rapid rotation so as to form a rotating annulus of air contained within and rotating with the casing 7. By the centrifugal action set up by the rotation of this annulus, the dust particles are driven to the outer portion thereof and lodged upon the outer wall of the casing 7 which rotates with the annulus. The vanes 18 extending into the path of the rotating air along the inner portion of the annulus then deflect the air inwardly and discharge the same from the opening 17.

When the cleaning operation has been finished, the dust may be removed by opening the cover 14 which carries with it the vanes 18 so as to expose the thumb nut 20 which secures the spider 10 and the casing 7 to the shaft 8. The operator may then remove this nut and slip the casing from the shaft, after which the cover 12 may be removed and the casing 7 emptied of its contents.

It is obvious that various changes may be made in details of construction without departing from the spirit of this invention; it is, therefore, to be understood that this invention is not to be limited to the specific details shown and described.

Having thus described the invention, what is claimed is:

1. In a portable suction sweeper, the combination with a casing having an inlet and an outlet, of rotating blades for producing a rotating annulus of air and stationary blades extending into the rotating annulus and conveying air to said outlet.

2. In a portable suction sweeper, in combination, a casing, means for drawing a dust-laden current of air into the casing and giving it a whirling motion to effect centrifugal separation, and means for scooping and conveying the cleansed air from the central portion of the whirling mass and discharging it.

3. In a portable suction sweeper, in combination, a casing, means for drawing a dust-laden current of air into the casing and giving it a whirling motion to effect centrifugal separation, and means for scooping and conveying the cleansed air from the central portion of the whirling mass and controlling its motion as it is discharged.

4. In a portable suction sweeper, the combination with a rotating casing having an inlet and an outlet, of rotary means adapted to cause the air within said casing to rotate therewith, thus producing a rotating annulus, a motor for rotating said casing and actuating said rotary means, and means for reducing the rotation of the air inside of the rotating annulus whereby a centripetal outflow is effected.

5. In a portable suction sweeper, the combination with a rotating casing having an inlet and an outlet, of vanes within said casing rotating therewith for producing a rotating annulus of air therein, a motor for rotating said blades and said casing and stationary blades extending into the rotating annulus for conveying air to said outlet.

6. In a portable suction sweeper, in combination, a casing, means for drawing a dust-laden current of air into the casing and giving it a whirling motion to effect centrifugal separation, and a plurality of blades disposed to collect cleansed air from the whirling mass and to discharge it.

7. In a portable suction sweeper, in combination, a casing, means for drawing a dust-laden current of air into the casing and giving it a whirling motion to effect centrifugal separation, and a plurality of stationary blades disposed to collect cleansed air from the whirling mass and to discharge it at substantially right angles to the axis of the whirling mass.

8. In a portable suction cleaner, the combination of a suction member, a rotating casing having an inlet communicating with the interior said suction member, a plurality of blades mounted for rotation, a motor having a driving connection at said inlet with said casing and blades and a plurality of stationary blades for retarding rotary movement of air centrally of said casing whereby a centripetal discharge is effected.

In testimony whereof I affix my signature this 15th day of November, 1922.

JOHN B. DYER.